US010072610B2

(12) United States Patent
Sannino et al.

(10) Patent No.: US 10,072,610 B2
(45) Date of Patent: Sep. 11, 2018

(54) METHOD AND A DEVICE FOR FEEDING A ROCKET ENGINE

(71) Applicant: SNECMA, Paris (FR)

(72) Inventors: Jean Michel Sannino, Saint-marcel (FR); François Lassoudiere, Vernon (FR); David Hayoun, Paris (FR)

(73) Assignee: Arianegroup SAS, Paris (FR)

( * ) Notice: Subject to any disclaimer, the term of this patent is extended or adjusted under 35 U.S.C. 154(b) by 568 days.

(21) Appl. No.: 14/440,835

(22) PCT Filed: Nov. 4, 2013

(86) PCT No.: PCT/FR2013/052621
§ 371 (c)(1),
(2) Date: May 5, 2015

(87) PCT Pub. No.: WO2014/072624
PCT Pub. Date: May 15, 2014

(65) Prior Publication Data
US 2015/0285187 A1  Oct. 8, 2015

(30) Foreign Application Priority Data
Nov. 6, 2012  (FR) ..................................... 12 60506

(51) Int. Cl.
*F02K 9/48* (2006.01)
*F02K 9/50* (2006.01)
(Continued)

(52) U.S. Cl.
CPC .................. *F02K 9/48* (2013.01); *F02K 9/50* (2013.01); *F02K 9/64* (2013.01); *F02K 9/972* (2013.01)

(58) Field of Classification Search
CPC ..... F02K 9/48; F02K 9/50; F02K 9/64; F02K 9/972
See application file for complete search history.

(56) References Cited

U.S. PATENT DOCUMENTS 3,374,623 A * 3/1968 Crosswhite ............... F02K 9/50
60/259
5,267,437 A * 12/1993 Foust ........................ F02K 9/48
60/206
(Continued)

FOREIGN PATENT DOCUMENTS

JP      H07-243350 A    9/1995
RU      2173399 C2      9/2001
(Continued)

OTHER PUBLICATIONS

English language translation of Notice of Rejection dated Jun. 13, 2017, in corresponding Japanese Application No. 2015-540197 (6 pages).
(Continued)

*Primary Examiner* — Lorne Meade
(74) *Attorney, Agent, or Firm* — Bookoff McAndrews, PLLC

(57) ABSTRACT

The invention relates to a feed device for feeding a thrust chamber (10) of a rocket engine (100) with first and second propellants. According to the invention, a first feed circuit (16) of the thrust chamber (10) comprises a turbopump (22) having at least one pump (22*a*) for pumping the first propellant from a first tank (12), and a turbine (22*b*) mechanically coupled to said pump (22*a*). The first feed circuit connects an outlet of the pump to an inlet of the turbine via a heat exchanger (24) configured to heat the first propellant with heat generated by the thrust chamber, in order to actuate the turbine. According to the invention, a second feed circuit (18) is configured to feed the thrust chamber with second propellant from a second tank (14) that is configured to be pressurized. The invention also provides a method of feeding a rocket engine thrust chamber with first and second propellants.

11 Claims, 2 Drawing Sheets

(51) Int. Cl.
  *F02K 9/97* (2006.01)
  *F02K 9/64* (2006.01)

(56) References Cited

U.S. PATENT DOCUMENTS

| | | | |
|---|---|---|---|
| 6,375,125 B1 * | 4/2002 | Kirn | B64G 1/402 |
| | | | 244/135 R |
| 9,222,438 B2 * | 12/2015 | Dobek | F02K 9/50 |
| 9,222,439 B2 * | 12/2015 | Dobek | F02K 9/50 |
| 2008/0256925 A1 | 10/2008 | Pederson et al. | |
| 2009/0013663 A1 * | 1/2009 | Kim | F02K 9/42 |
| | | | 60/39.461 |

FOREIGN PATENT DOCUMENTS

| | | |
|---|---|---|
| RU | 2451199 C1 | 5/2012 |
| WO | WO 2008/004744 A1 | 1/2008 |
| WO | WO 2011/007107 A1 | 1/2011 |

OTHER PUBLICATIONS

English language translation of the Russian Office Action dated May 11, 2017, in corresponding Russian Application No. RU2015121715 (5 pages) and the English language translation of the Search Report attached to the Russian Office Action (2 pages).

Search Report dated Feb. 6, 2014, in corresponding International Application No. PCT/FR2013/052621, filed on Nov. 4, 2013 (2 pages).

\* cited by examiner

METHOD AND A DEVICE FOR FEEDING A ROCKET ENGINE

This application is the U.S. national phase entry under 35 U.S.C. § 371 of International Application No. PCT/FR2013/052621, filed on Nov. 4, 2013, which claims priority to French Patent Application No. FR 1260506, filed on Nov. 6, 2012, the entireties of each of which are incorporated by reference herein.

FIELD OF THE INVENTION

The present invention relates to the field of feeding rocket engines, and in particular it relates to a feed device for feeding a thrust chamber with at least one first propellant and at least one second propellant.

In the description below, the terms "upstream" and "downstream" are defined relative to the normal flow direction of a propellant in a feed circuit.

BACKGROUND OF THE INVENTION

In rocket engines, thrust is typically generated by hot combustion gas expanding in a nozzle of a thrust chamber, the gas being produced by an exothermic chemical reaction within the thrust chamber. Thus, in operation, high pressures exist in the thrust chamber. In order to be able to continue to feed the thrust chamber in spite of those high pressures, the propellants need to be injected at pressures that are higher still. For this purpose, various means are known in the state of the art.

One known solution consists in using turbopumps. A turbopump comprises at least one pump driven by a turbine. In engines using the so-called "expander" cycle, the turbine is actuated by one of the propellants after it has passed through a heat exchanger in which it is heated by the heat produced in the thrust chamber. Thus, this transfer of heat can contribute simultaneously to cooling the walls of the thrust chamber and to actuating the pump of the turbopump.

Nevertheless, the use of expander cycle engines is limited.

As from a certain level of thrust, the energy available for feeding the turbine is limited by the capacity for extracting heat flux via the heat exchanger. In order to overcome this limitation, it is necessary to increase the length and the weight of the thrust chamber.

Furthermore, in order to govern the mixing ratio of the propellants, which is done by acting on the flow rate(s) through the turbine, other members and arrangements are necessary.

Another solution consists in pressurizing the tanks containing the propellants. Nevertheless, that approach puts a limit on the maximum pressure that can be reached in the thrust chamber, and thus on the specific impulse of the rocket engine. Another drawback of that solution lies in the use of low-performance propellants that are dense in order to limit the weight of the pressurization fluids. Propellants of low density lead to using tanks of large volume that therefore require large weights of pressurizing gas, and that leads to an increase in the overall weight of the rocket engine.

SUMMARY OF THE INVENTION

The object of the present invention is to remedy the above-mentioned drawbacks, at least substantially.

This object is achieved with a feed device for feeding a thrust chamber of a rocket engine with at least one first propellant and at least one second propellant, the device comprising at least one first tank for containing the first propellant, at least one second tank for containing the second propellant, at least one first feed circuit for feeding the thrust chamber and connected to the first tank, and at least one second feed circuit for feeding the thrust chamber and connected to the second tank, by the fact that said first feed circuit includes at least one turbopump with at least one pump for pumping the first propellant and at least one turbine mechanically coupled to said pump, said first feed circuit connecting an outlet of the pump with an inlet of the turbine of the turbopump via a heat exchanger configured to heat the first propellant with heat generated by the thrust chamber in order to actuate the turbine of the turbopump by expansion of the first propellant after being heated, by the fact that said second feed circuit is configured to feed the thrust chamber via an inlet valve with second propellant from the second tank that is configured to be pressurized to a pressure higher than the pressure that exists in the thrust chamber in order to feed the said thrust chamber, and by the fact that said inlet valve of the second feed circuit is an adjustable valve that serves to adjust the flow rate and thus the quantity of second propellant feeding the thrust chamber.

It can be understood that the rocket engine has a conventional thrust chamber into which the first and second propellants are injected. Thus, the hot gas resulting from combustion of the two propellants expands and is ejected from the thrust chamber in order to provide the rocket engine with thrust.

It can also be understood that the heat exchanger serves both to heat the first propellant so as to put it into the gaseous phase and to cool the wall of the thrust chamber by transferring heat from the combustion gas to the first propellant flowing through the heat exchanger.

Thus, the heated first propellant leaving the heat exchanger expands in the turbine, thereby driving it, with that having the effect in turn of actuating the pump.

Such operation of the first feed circuit is of the so-called "expander" cycle type.

It can also be understood that the second propellant feeding the thrust chamber is pressurized in the second tank to a pressure higher than the pressure that exists in the thrust chamber, and that the flow rate and quantity of second propellant fed to the thrust chamber are adjusted because of the regulation performed by the adjustable inlet valve.

By means of these provisions, the structure of the second feed circuit for feeding the thrust chamber with the second propellant is simplified in comparison with using a turbopump. All of the power extracted by expanding the first propellant downstream from the heat exchanger can be used for pumping the first propellant only. In addition, these provisions make it possible to have good control over the mixing ratio of the two propellants by using the inlet valve of the second feed circuit, which makes it possible to adjust the flow rate and thus the quantity of the pressurized second propellant that is injected into the thrust chamber. The adjustable inlet valve makes it possible to achieve good control over the mixing ratio of these propellants when feeding the thrust chamber.

Furthermore, by means of these provisions, the pressurized second tank containing the second propellant may be arranged all around the thrust chamber and there is no longer any need for the second tank to be above the thrust chamber as when a turbopump is used for pressurizing a propellant. This is made possible by the fact that the second propellant is not fed by a pump, which pump might run the risk of cavitating unless suitably dimensioned and positioned. This thus contributes to reducing the overall size of the feed device. Advantageously, the second tank may be arranged in particular beside the thrust chamber, thus making it possible to obtain a more compact structure for the assembly comprising the rocket engine and the tank.

Furthermore, this solution conserves good performance for the rocket engine and in particular provides good specific impulse.

In certain embodiments, at least one third tank is configured to contain a pressurized gas, said third tank being connected to the second tank via an expander.

It can be understood that the pressurized gas from the third tank pressurizes the second tank containing the second propellant. The expander makes it possible to adjust the pressure of the pressurizing gas entering into the second tank, and thus to adjust the pressure of the second propellant contained in the second tank.

In certain embodiments, the first feed circuit includes a booster pump coupled to a turbine that is suitable for being actuated by the expansion of a pressurized gas, said booster pump being situated downstream from the first tank and upstream from the pump of the turbopump.

It can be understood that the booster pump serves to boost the turbopump. Boosting makes it possible to maintain at least a minimum inlet pressure for the first propellant in the pump of the turbopump and to avoid cavitation phenomena, in particular at the end of emptying the first tank, where that would prevent making use of the first propellant contained in the first tank.

In certain embodiments, said turbine coupled to the booster pump is situated downstream from the third tank and upstream from the second tank of the second propellant.

It can be understood that the turbine of the booster pump is actuated by the pressurized gas contained in the third tank. This gas is then injected into the second tank in order to pressurize it.

In certain embodiments, the first propellant enters the pump of the turbopump in the thrust direction of the thrust chamber.

By means of this arrangement, the positioning of the high pressure circuit is optimized. The outlet from the pump of the turbopump and the outlet from the heat exchanger are located close respectively to the inlet of the heat exchanger and to the inlet of the turbine of the turbopump. This arrangement is made possible by installing the above-mentioned booster pump, which avoids cavitation phenomena at the inlet to the pump of the turbopump, which pump would otherwise be in a "head-down" position and might require a line with a bend between the booster pump and the inlet of the main pump.

In certain embodiments, the second tank is made of metal.

In certain embodiments, the second tank is made of reinforced composite material.

In order to contain the pressure of the second tank and avoid it deforming, the structure made of composite material is reinforced, e.g. by winding.

Furthermore, the second tank made of reinforced composite material makes it possible for the second propellant at the inlet of the chamber to reach a pressure that is higher than can be reached with a metal tank, thereby making it possible to reach a higher pressure in the chamber.

In certain embodiments, the propellants may be cryogenic. In particular, the first propellant may be liquid hydrogen and the second propellant may be liquid oxygen.

By means of these provisions, because the density of liquid oxygen is high compared with the density of liquid hydrogen, the second tank thus presents a smaller volume than the hydrogen tank, and consequently the weight of pressurization gas is limited and thus the volume of the third tank for pressurizing the second tank is limited compared to the situation in which it is the liquid hydrogen that is stored in the second tank.

In certain embodiments, the pressurized gas is helium.

This gas presents the advantage of being practically inert. Furthermore, when this gas is injected into the second tank, it remains in the gaseous state and does not condense, even when the second propellant is cryogenic.

In certain embodiments, the first feed circuit includes a feed valve situated downstream from the pump of the turbopump and upstream from the heat exchanger.

In certain embodiments, the first circuit includes a bypass valve situated downstream from the heat exchanger and upstream from the inlet to the thrust chamber.

In certain embodiments, the bypass valve is adjustable.

It can be understood that when the bypass valve is open, a portion of the first propellant leaving the heat exchanger passes through this valve and is injected directly into the thrust chamber without feeding the turbine of the turbopump. By means of these provisions, the flow rate and thus the quantity of first propellant fed to the thrust chamber is adjusted. The smaller quantity of propellant feeding the turbine serves to slow the turbine down, and as a result to slow down the pump of the turbopump.

In certain embodiments, the first circuit includes an on/off valve downstream from the pump of the turbopump and upstream from the heat exchanger.

It can be understood that the on/off valve serves to pass or prevent passage of the first propellant to the heat exchanger. It can thus be understood that the on/off valve is additional to the bypass valve, with the bypass valve adjusting the quantity of first propellant that is fed to the turbine of the turbopump and thus to the thrust chamber.

The present invention also provides a method of feeding a thrust chamber of a rocket engine with first and second propellants, wherein the first propellant is pumped from a first tank to the thrust chamber via a first feed circuit of the thrust chamber by at least one pump of a turbopump comprising said pump and a turbine that is mechanically coupled to the pump, the first feed circuit connecting an outlet of the pump to an inlet of the turbine via a heat exchanger configured to heat the first propellant with heat generated in the thrust chamber in order to actuate the turbine of the turbopump, by expansion of the first propellant after being heated in the heat exchanger, wherein the second propellant is pressurized in a second tank to an internal pressure higher than the internal pressure of the thrust chamber, and wherein the second propellant is propelled towards the thrust chamber by the internal pressure of said second tank via a second feed circuit of the thrust chamber connected to the second tank, said second circuit including an inlet valve.

Several embodiments are described in the present description. Nevertheless, unless specified to the contrary, characteristics described with reference to any one embodiment or implementation may be applied to another embodiment or implementation.

BRIEF DESCRIPTION OF THE DRAWINGS

The invention and its advantages can be better understood on reading the following detailed description of embodiments of the invention given as non-limiting examples. The description refers to the accompanying figures, in which.

DETAILED DESCRIPTION OF EMBODIMENTS

Figure 1:
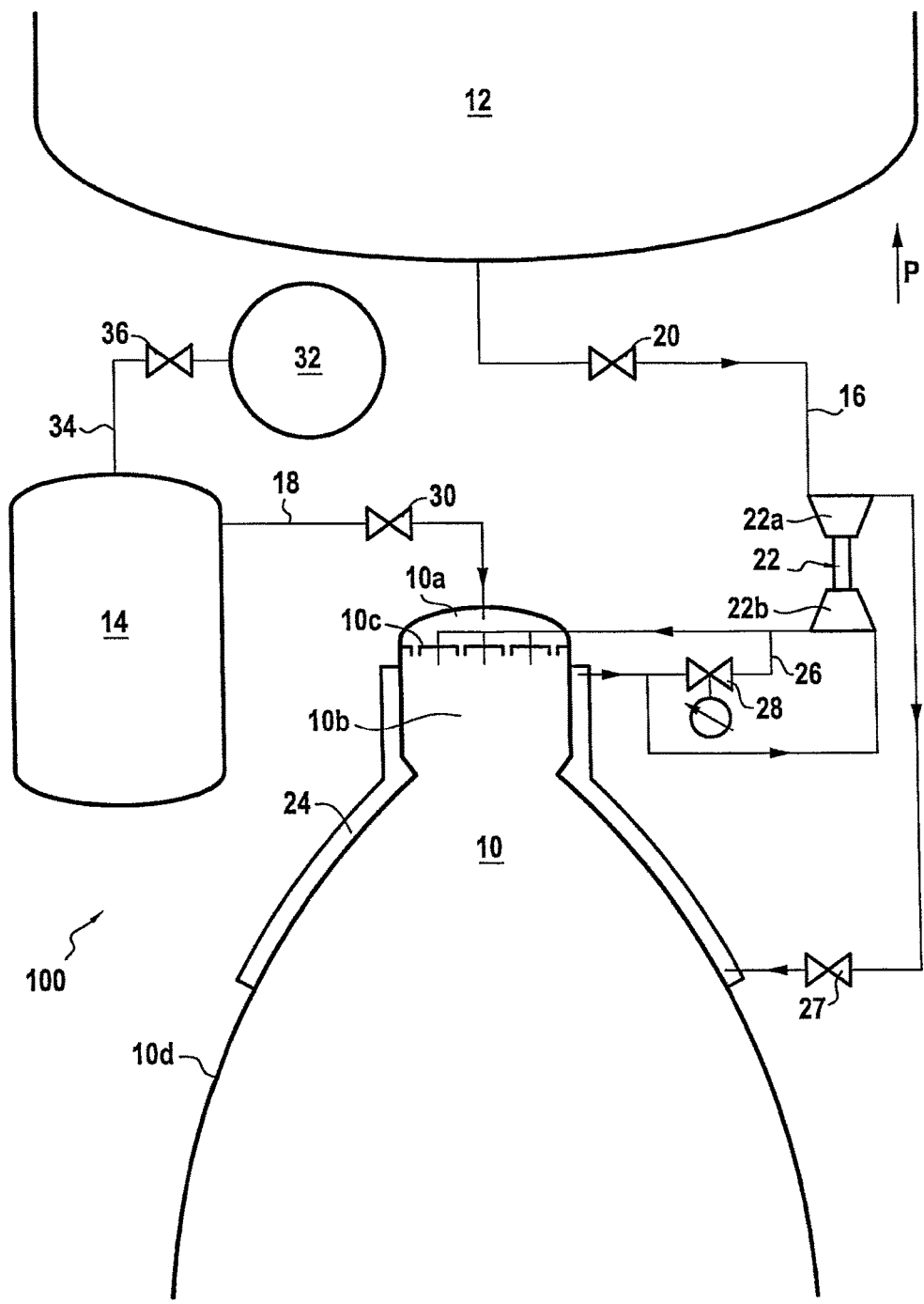
FIG. 1 is a diagrammatic view of a rocket engine having a feed device in a first embodiment of the invention, in which a pump of a turbopump is fed with a first propellant in a direction opposite to the propulsion direction of a thrust chamber of the rocket engine.

FIG. 1 shows a rocket engine 100 comprising thrust chamber 10 and a feed device for feeding the thrust chamber with first and second propellants in a first embodiment. The thrust chamber 10 comprises in succession an injection dome 10a for injecting the first propellant, and a combustion chamber 10b including in its top portion a set of injectors 10c through which the first and second propellants penetrate. The combustion chamber 10b is terminated by a diverging portion 10d that may be made of metal or of composite material, for example. Thus, after passing through the set of injectors 10c, the first propellant and the second propellant mix and enter into combustion in the combustion chamber 10b, thereby generating combustion gas providing the thrust of the rocket engine 100.

The feed device for the thrust chamber 10 comprises a first tank 12 containing a first propellant, e.g. cryogenic hydrogen in the liquid phase stored at about −253° C. The feed device also has a second tank 14 containing a second propellant, e.g. cryogenic oxygen in the liquid phase stored at about −183° C. Furthermore, in this example, the first tank 12 and the second tank 14 are cylindrical, however they could be of other shapes.

The feed device has a first feed circuit 16 for feeding the thrust chamber 10 with hydrogen that is connected to the first tank 12, which circuit is referred to below as the "first" circuit, and the feed device also has a second feed circuit 18 for feeding the thrust chamber 10 with oxygen and connected to the second tank 14, which circuit is referred to below as the "second" circuit.

In a first embodiment, the first feed circuit 16 has a conventional feed valve 20, and a turbopump 22 comprising a pump 22a and a turbine 22b, the pump 22a and the turbine 22b being mechanically coupled together. In this first embodiment, the liquid hydrogen from the first tank 12 enters the pump 22a in a direction opposite to the propulsion direction P of the thrust chamber 10.

The first feed circuit 16 also has a heat exchanger 24 formed in a wall of the combustion chamber 10b of the thrust chamber 10 so as to cool the wall of the combustion chamber 10b by transferring heat from the hot gas resulting from combustion between hydrogen and oxygen to the liquid hydrogen while it is flowing through the heat exchanger 24. This transfer of heat also contributes to heating the liquid hydrogen that, in the gaseous phase, expands in the turbine 22b, thereby having the effect of driving the turbine 22b of the turbopump 22.

Thus, the first feed circuit 16 for feeding hydrogen to the thrust chamber 10 operates in an "expander" cycle.

This first feed circuit 16 also has a bypass passage 26 with a bypass valve 28. The first feed circuit 16 also has a feed valve 27 arranged downstream from the pump 22a of the turbopump 22 and upstream from the heat exchanger 24. In this example, the feed valve 27 is an on/off valve, however, in a variant, it could be an adjustable valve serving to adjust the flow rate and thus the quantity of first propellant that enters into the combustion chamber 10b. Thus, when the feed valve 27 is and adjustable valve, it is possible to omit the bypass valve 28.

The second feed circuit 18 for feeding the combustion chamber 10b with oxygen comprises an adjustable inlet valve 30 enabling the flow rate and thus the quantity of oxygen that is fed to said combustion chamber 10b to be adjusted.

The second tank 14 containing oxygen is pressurized by a pressurized gas, helium in this example, contained in a third tank 32. This third tank 32 is connected to the second tank 14 via a pressurizing circuit 34 including an expander 36. The present invention is not limited to a single oxygen tank but could cover a plurality of oxygen tanks, e.g. arranged all around the thrust chamber 10, where each of said tanks is pressurized by a supply of pressurization gas. In addition, in a variant, the oxygen tank(s) and their respective supplies of gas may be jettisoned as they are used up.

These provisions conserve good performance for the rocket engine and in particular they serve to provide a good specific impulse lying in the range 455 seconds (s) to 465 s, depending on the length of the diverging portion 10d.

The second tank 14 containing oxygen may be made of metal, in which case it is possible to obtain an oxygen pressure at the inlet to the combustion chamber 10b of about 2 megapascals (MPa), thus making it possible to achieve a chamber pressure of approximately 1.5 MPa. Furthermore, the second tank 14 may be made of a composite material reinforced by winding, for example. This type of tank makes it possible to achieve chamber pressures that are higher than when the tank is made of metal. Specifically, it makes it possible to obtain an oxygen pressure at the inlet to the combustion chamber 10b of about 5 MPa and to achieve a chamber pressure lying in the range 3 MPa to 4 MPa.

In order to feed the combustion chamber 10b with hydrogen, the hydrogen is pumped from the first tank 12 by the pump 22a of the turbopump 22. The pumped hydrogen passes through the on/off valve 27 and flows through the heat exchanger 24. The heat produced by the combustion of the mixture of hydrogen and oxygen in the combustion chamber 10b contributes to heating the liquid hydrogen flowing in the heat exchanger 24. At the outlet from the heat exchanger 24 a portion of the heated hydrogen passes through the adjustable bypass valve 28 in order to reach the combustion chamber 10b directly without passing through the turbine 22b of the turbopump 22. The remainder of the heated hydrogen feeds said turbine 22b and expands therein, thereby having the effect of actuating it and thus of actuating the pump 22a of the turbopump 22. The bypass valve 28 thus serves to adjust the flow rate and thus the quantity of hydrogen for injection into the combustion chamber 10b by adjusting the power of the turbine 22b of the turbopump 22. The greater the quantity of heated hydrogen received by the turbine 22b, the greater the extent to which the pump 22a of the turbopump 22 is actuated and thus the greater the amount of hydrogen it pumps from the first tank 12.

In addition, in order to feed the combustion chamber 10b with oxygen, helium under pressure is delivered to the second tank 14 via the pressurizing circuit 34. The pressure of the helium leaving the pressurizing circuit 34 is adjusted by the expander 36. This provision has the effect of pressurizing the oxygen contained in the second tank 14 to a pressure that is higher than the pressure existing in the combustion chamber 10b. Thereafter, the adjustable inlet valve 30 is opened and adjusts the flow rate and thus the quantity of pressurized oxygen that is injected into the combustion chamber 10b in order to achieve a good mixing ratio between the hydrogen and the oxygen.

Figure 2:
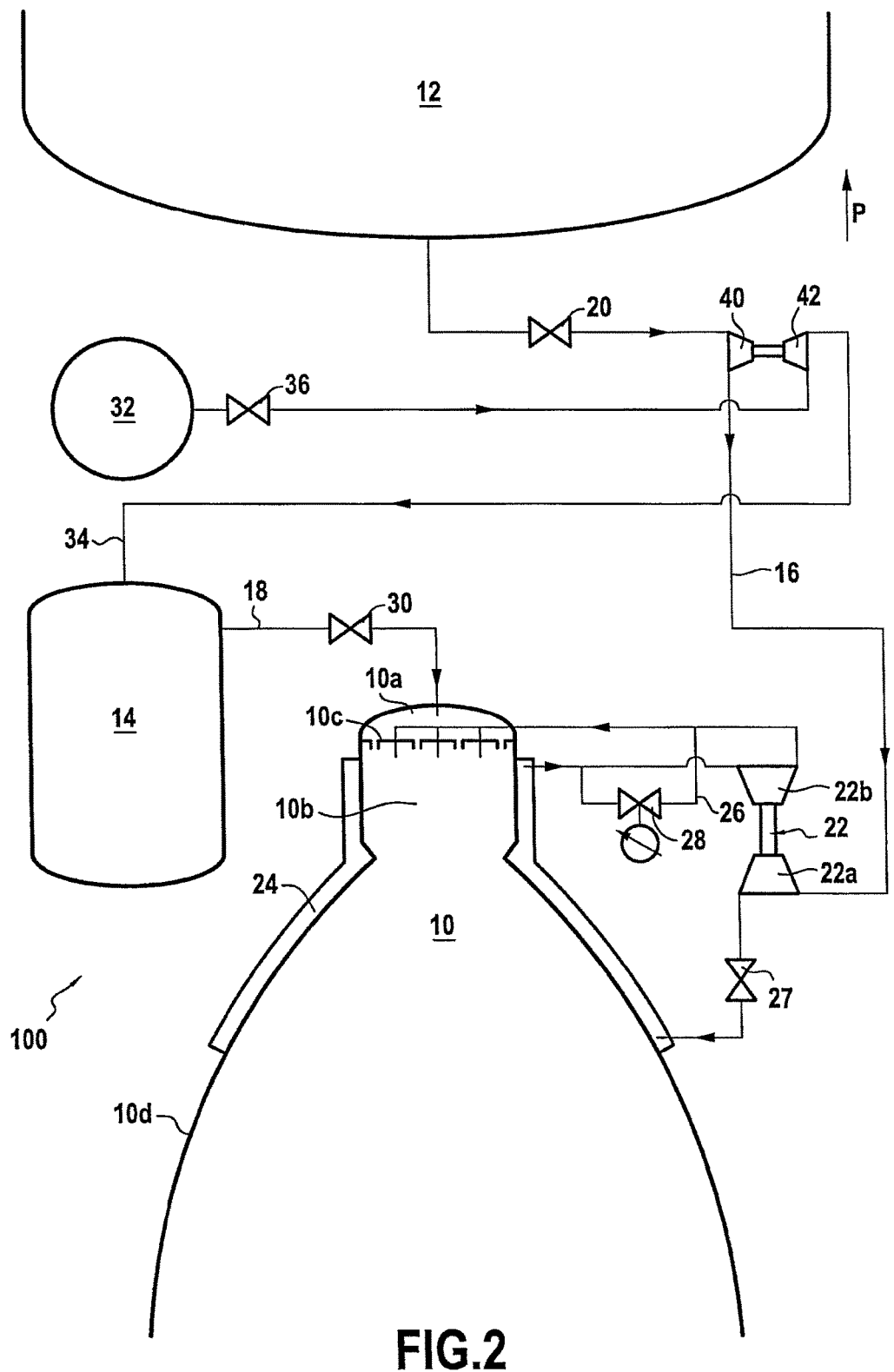
FIG. 2 is a diagrammatic view of a rocket engine including a feed device in a second embodiment, in which a pump of a turbopump is fed with a first propellant in a propulsion direction of a thrust chamber of the rocket engine.

A rocket engine 100 with a feed device in a second embodiment is shown in FIG. 2. Most of the elements of this rocket engine 100 are identical or equivalent to those described above for the first embodiment and they are consequently given the same reference numbers.

The second embodiment differs from the first in that the first propellant enters the pump 22a of the turbopump 22 in the thrust direction P of the thrust chamber 10, thereby facilitating mechanical integration. Under such circumstances, the first feed circuit 16 has a booster pump 40 inserted downstream from the feed valve 20 and upstream from the pump 22a of the turbopump 22. This booster pump 40 is mechanically connected to a turbine 42. This turbine 42 is inserted in the pressurizing circuit 34 downstream from the third tank 32 of pressurized helium and downstream from the expander 36, and upstream from the second tank 14. The turbine 42 coupled to the booster pump 40 is thus actuated by pressurized helium driving said booster pump 40. The booster pump 40 serves to avoid cavitation phenomena at the inlet to the pump 22a of the turbopump 22, which phenomena might occur in particular at the end of emptying the first tank 12, given the orientation of the turbopump 22 in this embodiment.

The operation of the feed device in this second embodiment is almost analogous to that of the first embodiment. It differs from the first embodiment in that prior to being sent into the second tank 14 for the purpose of pressurizing the second tank 14 containing liquid oxygen, the helium contained in the third tank 32 feeds the turbine 42 coupled to the booster pump 40, thereby actuating said booster pump 40. As a result, at the outlet from the feed valve 20, the oxygen passes through the booster pump 40, with the booster pump 40 serving to boost the pump of the turbopump.

Although the present invention is described with reference to specific embodiments, it is clear that modifications and changes may be performed thereto without going beyond the general scope of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A feed device for feeding a thrust chamber of a rocket engine with at least one first propellant and at least one second propellant, the device comprising:
   at least one first tank for containing the first propellant;
   at least one second tank for containing the second propellant;
   at least one first feed circuit for feeding the thrust chamber and connected to the first tank; and
   at least one second feed circuit for feeding the thrust chamber and connected to the second tank;
   said feed device being characterized in that said first feed circuit includes at least one turbopump with at least one pump for pumping the first propellant from the first tank and at least one first turbine mechanically coupled to said pump, said first feed circuit connecting an outlet of the pump with an inlet of the at least one first turbine of the turbopump via a heat exchanger configured to heat the first propellant with heat generated by the thrust chamber in order to actuate the at least one first turbine of the turbopump by expansion of the first propellant after being heated, and in that said second feed circuit is configured to feed the thrust chamber via an inlet valve with the second propellant from the second tank that is configured to be pressurized to a pressure higher than the pressure that exists in the thrust chamber in order to feed said thrust chamber, in that said inlet valve of the second feed circuit is an adjustable valve that serves to adjust the flow rate and thus the quantity of second propellant feeding the thrust chamber,
   wherein at least one third tank is configured to contain a pressurized gas, said at least one third tank being connected to the second tank via an expander,
   wherein the first feed circuit includes a booster pump coupled to a second turbine that is suitable for being actuated by the expansion of a pressurized gas, said booster pump being situated downstream from the first tank and upstream from the pump of the turbopump, and
   wherein said second turbine coupled to the booster pump is situated downstream from the at least one third tank and upstream from the second tank of the second propellant.

2. The feed device according to claim 1, wherein the first propellant enters the pump of the turbopump in the thrust direction of the thrust chamber.

3. The feed device according to claim 1, wherein the second tank is made of metal.

4. The feed device according to claim 1, wherein the second tank is made of reinforced composite material.

5. The feed device according to claim 1, wherein the first propellant is liquid hydrogen and wherein the second propellant is liquid oxygen.

6. The feed device according to claim 1, wherein the pressurized gas contained in the at least one third tank is helium.

7. The feed device according to claim 1, wherein the first feed circuit includes a feed valve situated downstream from the pump of the turbopump and upstream from the heat exchanger.

8. The feed device according to claim 1, wherein the first feed circuit includes a bypass valve situated downstream from the heat exchanger and upstream from the inlet to the thrust chamber.

9. The feed device according to claim 8, wherein the bypass valve is adjustable.

10. The feed device according to claim 8, wherein the first feed circuit includes an on/off valve downstream from the pump of the turbopump and upstream from the heat exchanger.

11. A method of feeding a thrust chamber of a rocket engine with first and second propellants, the method being characterized in that:
   the first propellant is pumped from a first tank to the thrust chamber via a first feed circuit of the thrust chamber by at least one pump of a turbopump comprising said pump and a first turbine that is mechanically coupled to the pump, the first feed circuit connecting an outlet of the pump to an inlet of the first turbine via a heat exchanger configured to heat the first propellant with heat generated in the thrust chamber in order to actuate the first turbine of the turbopump, by expansion of the first propellant after being heated in the heat exchanger;
   in that the second propellant is pressurized in a second tank to an internal pressure higher than the internal pressure of the thrust chamber;
   in that the second propellant is propelled towards the thrust chamber by the internal pressure of said second tank via a second feed circuit of the thrust chamber connected to the second tank, said second circuit including an inlet valve; and in that said inlet valve of the second feed circuit is an adjustable valve that enables the flow rate and thus the quantity of second propellant feeding the thrust chamber to be adjusted, wherein at least one third tank contains a pressurized gas, said at least one third tank being connected to the second tank via an expander, wherein the first feed circuit includes a booster pump coupled to a second turbine that is actuated by the expansion of a pressurized gas, said booster pump being situated downstream from the first tank and upstream from the pump of the turbopump, and wherein said second turbine coupled to the booster pump is situated downstream from the at least one third tank and upstream from the second tank of the second propellant.

\* \* \* \* \*